United States Patent
Kratzer

(10) Patent No.: US 8,246,004 B2
(45) Date of Patent: Aug. 21, 2012

(54) VALVE CARTRIDGE FOR A SOLENOID VALVE, AND ASSOCIATED SOLENOID VALVE

(75) Inventor: Dietmar Kratzer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 263 days.

(21) Appl. No.: 12/742,228

(22) PCT Filed: Sep. 23, 2008

(86) PCT No.: PCT/EP2008/062666
§ 371 (c)(1),
(2), (4) Date: May 10, 2010

(87) PCT Pub. No.: WO2009/059843
PCT Pub. Date: May 14, 2009

(65) Prior Publication Data
US 2010/0252762 A1    Oct. 7, 2010

(30) Foreign Application Priority Data
Nov. 8, 2007   (DE) .......................... 10 2007 053 299

(51) Int. Cl.
*F16K 31/02* (2006.01)
(52) U.S. Cl. .................. 251/129.15; 251/357
(58) Field of Classification Search ............. 251/129.02, 251/129.15, 360, 357; 335/298; 137/315.03
See application file for complete search history.

(56) References Cited

U.S. PATENT DOCUMENTS

| 6,412,884 | B1 | 7/2002 | Takayama et al. | |
|---|---|---|---|---|
| 6,978,801 | B2 * | 12/2005 | Takahashi | 137/543.19 |
| 7,243,680 | B2 * | 7/2007 | Golovatai-Schmidt et al. | 137/596.17 |
| 2006/0097210 | A1 * | 5/2006 | Fong et al. | 251/129.15 |
| 2008/0203343 | A1 | 8/2008 | Kratzer | |

FOREIGN PATENT DOCUMENTS

| DE | 19711375 A1 | 9/1998 |
|---|---|---|
| DE | 19946996 A1 | 5/2000 |
| WO | 2007033855 A1 | 3/2007 |

* cited by examiner

*Primary Examiner* — Eric Keasel
*Assistant Examiner* — Seth Faulb

(57) ABSTRACT

The invention relates to a valve cartridge for a solenoid valve having a capsule, a magnetic armature that is movably guided within the capsule, a valve insert inserted into the capsule at a first end, and a valve body, which is pressed into a second end of the valve insert, and having a main valve seat. The magnetic armature, moved by a generated magnetic force, moves a tappet that is guided within the valve insert. The tappet has a locking element which includes a sealing element which plunges into the main valve seat of the valve body in a sealing manner for carrying out a sealing function, and an associated solenoid valve. According to the invention, the valve insert is configured as a slotted bushing, having a collar integrated onto the second end of the valve insert in order to increase an outer diameter and a shape stability of the valve insert.

20 Claims, 5 Drawing Sheets

VALVE CARTRIDGE FOR A SOLENOID VALVE, AND ASSOCIATED SOLENOID VALVE

CROSS-REFERENCE TO RELATED APPLICATION

This application is a 35 USC 371 application of PCT/EP2008/062666 filed on Sep. 23, 2008.

BACKGROUND OF THE INVENTION

1. Field of the Invention

The invention relates to a valve cartridge for a solenoid valve, and to an associated solenoid valve.

2. Description of the Prior Art

A conventional solenoid valve, particularly for a hydraulic unit, which is used for instance in an anti-lock brake system (ABS) or a traction control system (TC system) or an electronic stability program system (ESP system), is shown in FIG. 1. As can be seen from FIG. 1, the conventional solenoid valve 1, which is embodied for instance as a regulating valve that is open when without current, includes a magnet assembly 5 for generating a magnetic flux, which includes a housing jacket 5.1, a winding holder 5.2, a coil winding 5.3, and a cover disk 5.4; and a valve cartridge 7, which includes a capsule 7.1, a valve insert 8 joined to the capsule 7.1 via a sealing weld 7.2, a magnet armature 4 having a tappet 2, which tappet has a closing element 2.1 and a sealing element 2.2, and a restoring spring 6. By means of supplying current to the coil winding 5.3 via electrical terminals 5.5, the magnet assembly 5 generates a magnetic force which moves the longitudinally movable magnet armature 4, along with the tappet 2, against the valve insert 8 counter to the force of the restoring spring 6. The valve insert 8 conducts the magnetic flux, introduced by the magnet assembly 5 via the cover disk 5.4, axially across an air gap 3 in the direction of the magnet armature 4. In addition, the valve insert 8 receives the so-called valve body 3, which includes a main valve seat 3.1 into which the sealing element 2.2 embodied as a sealing dome plunges sealingly in order to realize the sealing function of the solenoid valve 1. As can also be seen from FIG. 1, the rotationally symmetrically embodied valve insert 8 guides the tappet 2 and its sealing element 2.2 from outside. This means that the tappet 2 with the sealing element 2.2 is guided in an inner bore inside the valve insert 8. The valve insert 8, together with the magnet armature 4, is also part of the magnetic circuit that is generated by the magnet group 5. The capsule 7.1, which as a rule is nonmagnetic, forms a secondary air gap in the magnetic circuit. Over a relatively small area, which has a small outer diameter, the magnet armature 4 guided in the capsule 7.1 presses onto the tappet 2, which with its sealing element 2.2 embodied as a sealing dome seals off or opens up a defined gap, for the sake of pressure modulation, in the main valve seat 3.1 of the valve body 3 that is embodied as a conical seat. The valve insert 8 seals off the outside and is hydraulically tightly calked by means of the its calking geometry 8.1 in a fluid block 40. The compression spring 6 keeps the tappet 2 in an open position, in a currentless state of the solenoid valve.

ADVANTAGES AND SUMMARY OF THE INVENTION

The valve cartridge of the invention for a solenoid valve has the advantage over the prior art that a valve insert is braced radially by at least two ribs on a capsule, and a tappet is guided between the valve insert and the capsule via at least two corresponding longitudinal ribs. The dimensions of the at least two ribs of the valve insert and the dimensions of the at least two corresponding longitudinal ribs of the tappet are adapted to one another, so that the longitudinal ribs of the tappet are guided in segments that are left free between the ribs of the valve insert, and the ribs of the valve insert are guided in the free segments between the longitudinal ribs of the tappet. Thus unlike the prior art, the tappet is disposed outside the valve insert, or the valve insert is shifted inward. Moreover, the tappet has a closing element with a sealing element, and it is moved by a magnet armature guided movably inside the capsule, and the sealing element, for performing a sealing function, plunges sealingly into a main valve seat of a valve body. At the bracing points, embodied as ribs, of the valve insert, very good inputting of the magnetic flux generated by a magnet assembly is effected. With the sealing element of the closing element, the tappet seals off in the main valve seat of the valve body, and the longitudinal ribs of the tappet are guided up to a pole face of the magnet armature in the segments of the valve insert that are left free.

By means of the valve cartridge of the invention, an existing magnetic force is made more effectively available for the tappet motion and for an internal equilibrium of forces of the associated solenoid valve. Moreover, by reducing degrees of freedom, the guidance of the tappet and armature is improved, while the outside dimensions of the valve cartridge are the same or similar. Moreover, simpler geometries of the parts are advantageously possible for the valve insert and the tappet, so that alternative manufacturing methods can be employed that can advantageously produce less-expensive and/or more-precise parts. For instance, it is possible, because of its increased diameter, to produce the tappet by means of a metal deep-drawing process, in order to improve the precision of the tappet, particularly in the region of the sealing element.

The valve cartridge of the invention advantageously makes a larger pole face possible between the valve insert and the magnet armature, with a greater available magnetic force. By means of more free spaces, using a favorable magnetic force operating point, this advantageously enables a more favorable design of an associated solenoid valve with regard to pressure adjustability.

As a further advantage, the increased contact diameter of the tappet on the pole face of the armature lends this connection greater stability and improves the adjustment accuracy, since the tendency to tilting of the tappet is reduced because of the lesser relative radial displacement.

As a further advantage, the degrees of freedom of the tappet are restricted by means of an axial guidance of the tappet ribs in the free segments of the valve insert. As a result, tappet rotation can advantageously be restricted, and the pressure adjustment accuracy can be improved.

It is especially advantageous that the valve insert is embodied with at least three ribs, and the tappet is embodied with at least three corresponding longitudinal ribs, and angles between the individual ribs and between the individual longitudinal ribs are unequal. If the angles between the at least three ribs are not equal but different and are embodied so as to fit in only one angular position and are combined with an angle encoding of the valve body, then it can be made compulsory that the individual valve parts can be installed only in a defined angular position relative to one another. This is advantageous for the sake of the least possible functional deviation between individual valves of the same kind, so that the batch variation can be reduced.

In a feature of the valve cartridge of the invention, the longitudinal ribs of the tappet rest for instance flatly on the pole face of the magnet armature. Alternatively, the longitudinal ribs of the tappet engage corresponding indentations in the pole face of the magnet armature, so that an angular association of tappet segments and corresponding indentations in the pole face of the magnet armature can advantageously be effected.

In a further feature of the valve cartridge of the invention, the tappet has an integrally formed-on encompassing support for a restoring spring that is braced on one face end of the valve body.

The longitudinal segments of the tappet, in adaptation to an outer contour of the valve insert, can have a shape of essentially a circular portion or an undulating shape or a triangular shape. However, the tappet shape is not restricted to these shapes, but can assume arbitrary shapes instead. By means of the tappet shape, a volumetric compensation between the top and underside of the valve insert can for instance be improved, or the tappet guidance between the capsule and the valve insert can be expediently varied and optimized.

In a further feature of the valve cartridge of the invention, the capsule is calked in a calking region with a fluid block via a valve bush, and the valve body is inserted with the main valve seat into the capsule. As a result, the capsule also takes on the sealing function, upon the calking of the valve cartridge in the fluid block. Since the capsule also takes on the sealing function toward the outside from the valve insert, the valve assembly can advantageously be simplified. In comparison to the prior art, a sealing weld between the capsule and the valve insert is no longer necessary. Therefore the expensive welding systems necessary for that and the associated process step can be eliminated. The calking forces are absorbed by the valve bush. Moreover, the valve body can be pressed in fluid-tight fashion with the fluid block.

Advantageous embodiments of the invention, described below, as well as conventional exemplary embodiments explained above for the sake of better comprehension of the invention, are shown in the drawings. In the drawings, identical reference numerals identify components and elements that perform the same or analogous functions.

BRIEF DESCRIPTION OF THE DRAWINGS

The invention will be described below in conjunction with the accompanying drawings, in which.

DESCRIPTION OF THE PREFERRED EMBODIMENTS

Figure 1:
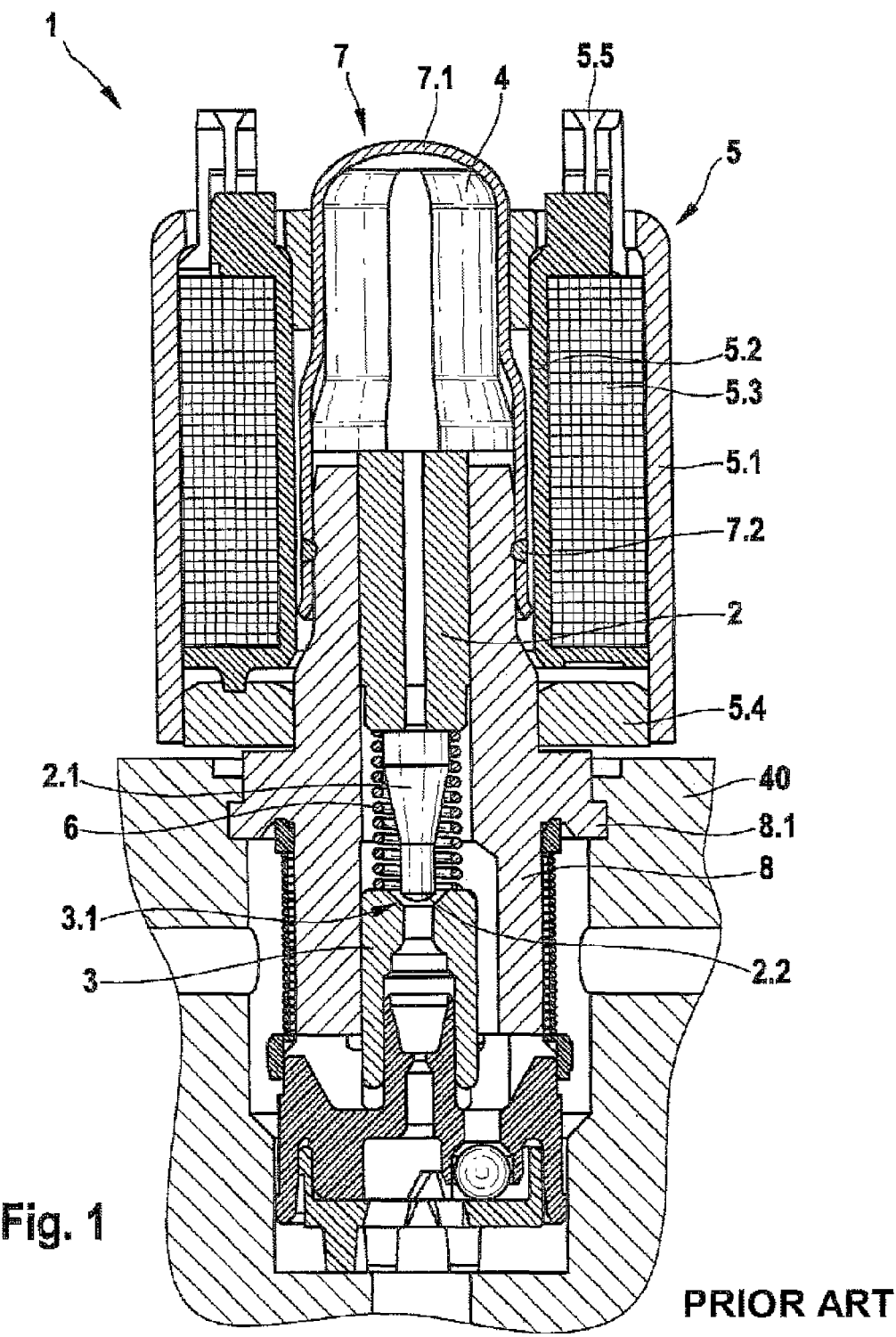
FIG. 1 shows a schematic sectional view of a conventional solenoid valve.
Figure 2:
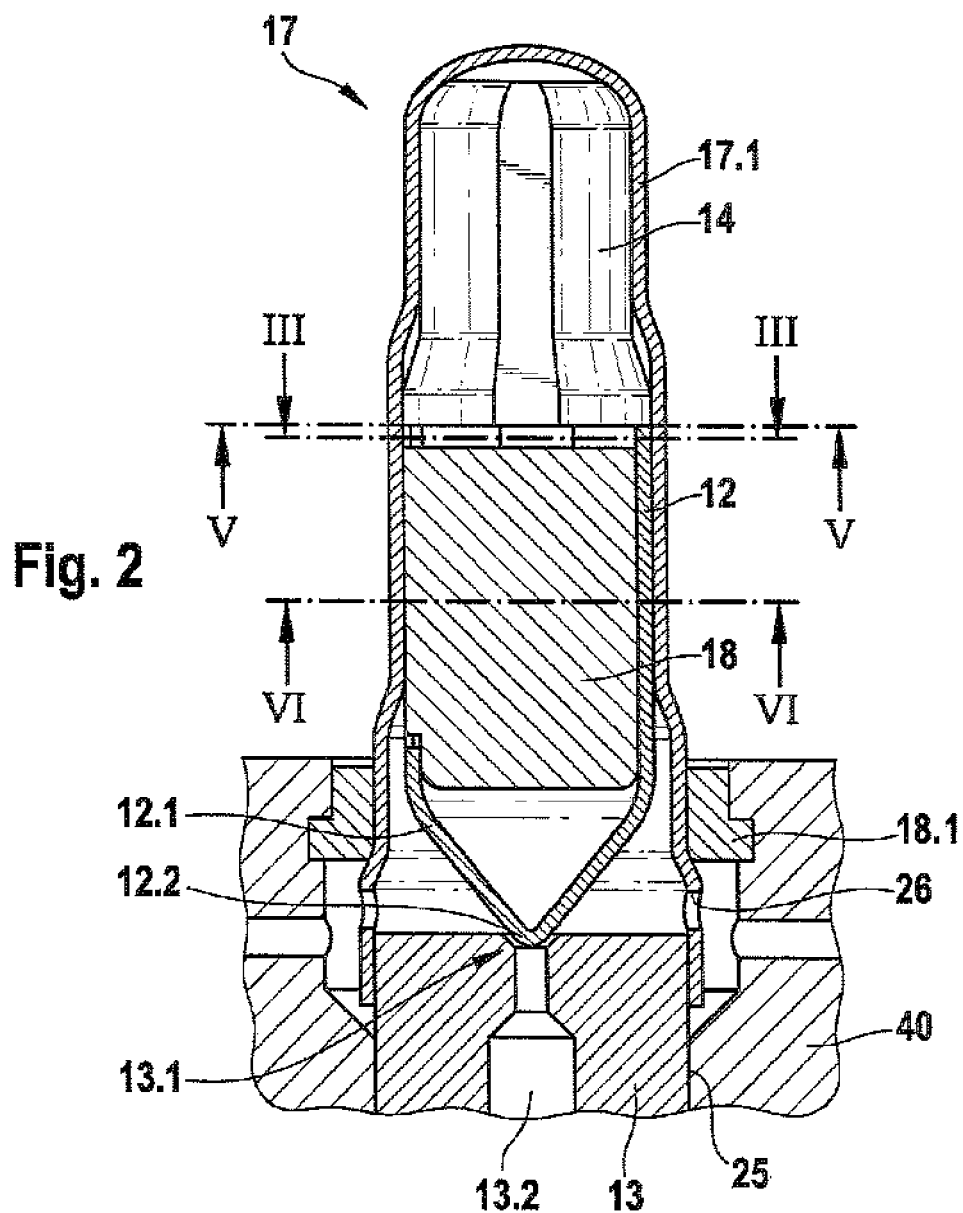
FIG. 2 shows a schematic sectional view of components essential to the invention of a valve cartridge for a solenoid valve.

As can be seen from FIG. 2, a valve cartridge 17 of the invention for a solenoid valve includes a capsule 17.1, a magnet armature 14 guided movably inside the capsule 17.1, a valve insert 18 inserted into the capsule 17.1, and a valve body 13 with a main valve seat 13.1. The magnet armature 14 is moved by a magnetic force, which is generated by a magnet assembly, not shown, that corresponds for instance to the conventional magnet assembly 5 shown in FIG. 1. The magnet armature 14 moves a tappet 12, which is guided by the valve insert 18 and has a valve insert 12.1 with a sealing element 12.2, in the direction of the valve body 13, in order for the sealing element 12.2 to plunge sealingly into the main valve seat 13.1. As can also be seen from FIG. 2, the capsule 17.1 of the valve cartridge 17 of the invention, which capsule is embodied with a greater length in comparison to the conventional valve cartridge 7 of FIG. 1, is calked via a valve bush 18.1 at a calking region with a fluid block 40, and the valve body 13 is inserted with the main valve seat 13.1 into the capsule 17.1 and pressed in fluid-tight fashion with the fluid block 40 in the region 25. The delivery of fluid is effected through a corresponding through bore 13.2 in the valve body 13, and the fluid outflow from the valve cartridge 17 is effected through radial bores 26 in the capsule 17.1.

Figure 3:
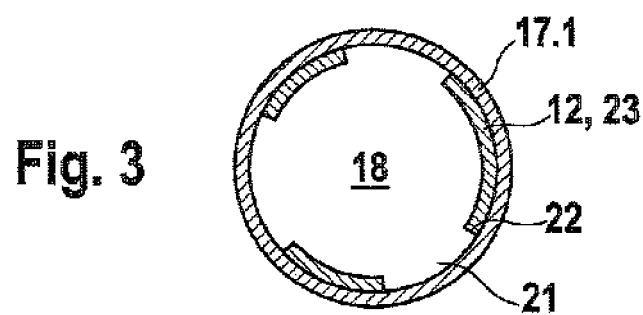
FIG. 3 shows a schematic sectional view of a first embodiment of the valve cartridge of the invention, without a lower valve part.
Figure 4A:
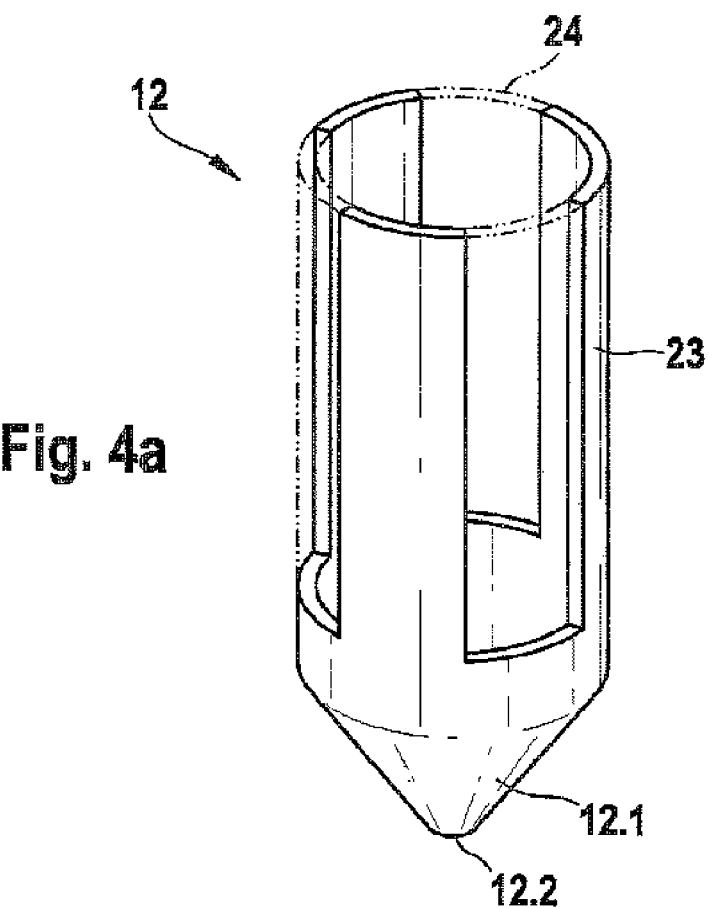
FIG. 4a shows a perspective view of a tappet for the valve cartridge of FIGS. 2 and 3.
Figure 4B:
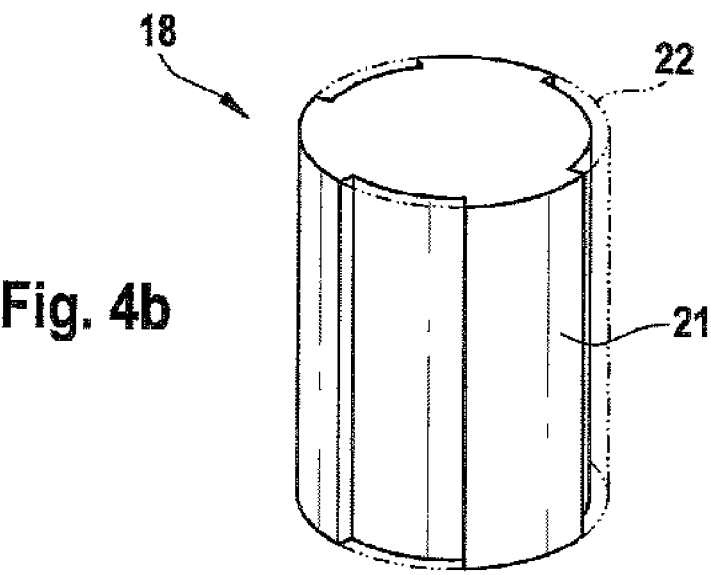
FIG. 4b shows a perspective view of a valve insert for the valve cartridge of FIGS. 2 and 3.

As can also be seen from FIGS. 3 through 4b, the valve insert 18 in the exemplary embodiment shown is braced with three ribs 21 radially on the capsule 17.1, and the tappet 12 is radially guided between the valve insert 18 and the capsule 17.1 via three corresponding longitudinal ribs 23. The dimensions of the ribs 21 of the valve insert 18 and the dimensions of the corresponding longitudinal ribs 23 of the tappet 12 are adapted to one another.

The nucleus of the invention is thus to design the tappet 12 as being located outside the valve insert 18, or to shift the valve insert 18 inward. The valve insert 18 is now braced radially on the capsule 17.1 only at the ribs 21, in order at these point to enable very good inputting points of the magnetic flux generated by the magnet assembly, not shown. Analogously to the conventional valve cartridge 7 of FIG. 1, the tappet 12 seals off the valve body 13 in the main valve seat 13.1 and is guided, in the segments 22 left free of the valve insert 18, via the longitudinal ribs 23 up to a pole face 14.1 (FIGS. 5a and 5b) of the magnet armature 14. As can be seen from FIGS. 3 and 4a, the tappet 12 is not embodied as entirely round; instead, it has longitudinal ribs 23 and free segments 24 for the ribs 21 of the valve insert 18. This intermeshing of the tappet 12 and valve insert 18 is particularly clearly visible in the sectional view of FIG. 3.

In comparison to the conventional valve cartridge 7 of FIG. 1, the valve cartridge of the invention has a larger effective pole face between the valve insert 18 and the magnet armature 14, with a greater available magnetic force. By means of more free spaces in the use of a favorable magnetic force operating point, this makes a more-favorable design of the valve cartridge 17 and of the associated solenoid valve possible with respect to pressure adjustability. Moreover, simpler part geometries for the valve insert 18 and the tappet 12 are possible. For instance, because of its greater diameter, the tappet 12 is better suited to metal deep-drawing processes, and as a result, the precision of the tappet 12, especially at the sealing element 12.2 embodied as a sealing dome, can be increased. Moreover, the contact diameter of the tappet 12 on the pole face 14.1 of the magnet armature is greater. This lends the connection between the magnet armature 14 and the tappet 12 more stability and, because of a lesser radial relative displacement, a reduced tendency to tilting of the tappet 12. The overall adjustment accuracy of the valve cartridge 17 of the invention is improved.

As a result of the axial guidance of the longitudinal ribs 23 of the tappet 12 in the free segments 22 of the valve insert 18 and of the ribs 21 of the valve insert 18 in the free segments 24 of the tappet 12, the degrees of freedom of the tappet are restricted, possible rotation of the tappet 12 is avoided, and the pressure adjustment accuracy is improved. The angles between the ribs 23 and between the segments 24 can be embodied as equal, and if there are three ribs 23 and segments 24 each, the angles can amount for instance to 120°. Alternatively, the angles between the ribs 23 and the segments 24 can be embodied differently, and if there are three ribs 23 and segments 24 each, the angles can for instance amount to 118°, 120', and 122°. The dispositions of the longitudinal ribs 23 of the tappet 12 and of the ribs 21 of the valve insert 18 can be adapted to one another such that they fit into one another in only one angular position. This can be combined with an angle encoding of the valve body 13. As a result, it can be made compulsory that the individual valve parts can be installed only in a defined angular position relative to one another. This is advantageous for attaining the least possible functional deviation among individual examples of valves, or in other words little batch variation.

Figure 5A:
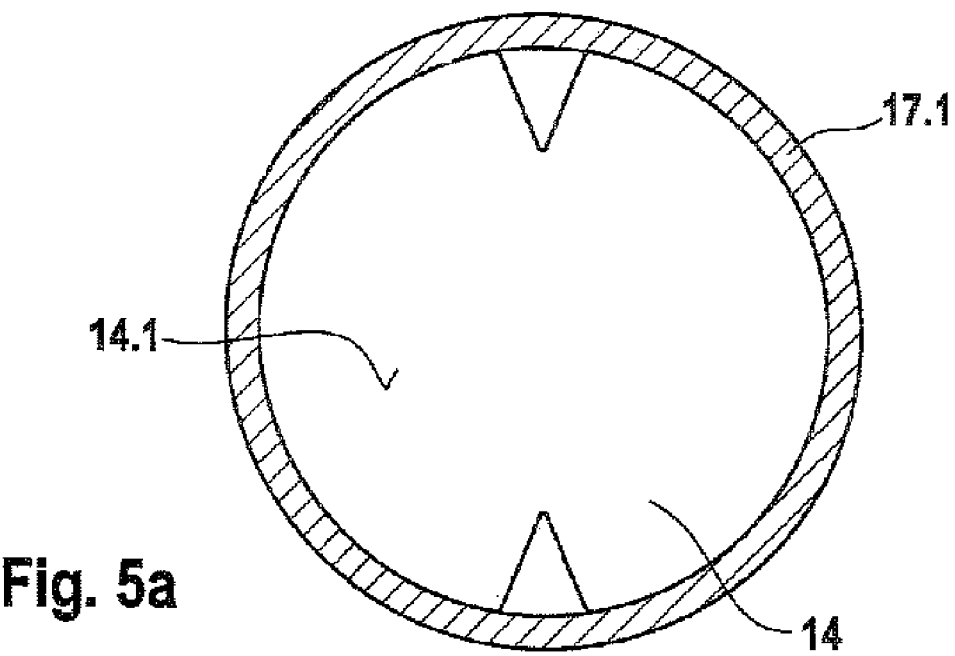
FIGS. 5a and 5b each show a schematic sectional view of the valve cartridge along the section line V-V in FIG. 2.
Figure 5B:
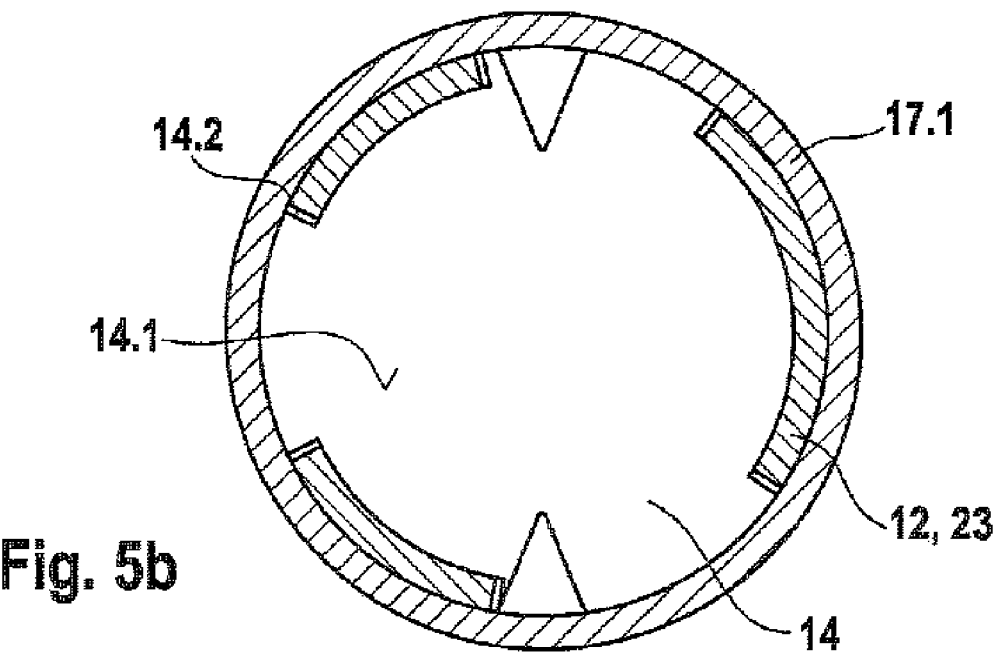

As can be seen from the sectional views in FIGS. 5a and 5b (see Brief Description of the Drawings for FIGS. 5a and 5b), the longitudinal ribs 23 of the tappet 12, in an embodiment shown in FIG. 5a, can rest flatly on the pole face 14.1 of the magnet armature 14. Alternatively to the embodiment of FIG. 5a with tappet ribs 23 resting flatly on the pole face 14.1 of the magnet armature 14, an angular association of the tappet ribs 23 and corresponding indentations 14.2 in the pole face 14.1 of the magnet armature 14 can be made. As can be seen from FIG. 5b, the longitudinal ribs 23 of the tappet 12 engage the corresponding indentations 14.2 in the pole face 14.1 of the magnet armature 14.

Figure 6A:
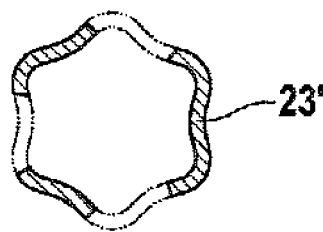
FIGS. 6a and 6b each show a schematic sectional view of the tappet along the section line VI-VI in FIG. 2.
Figure 6B:
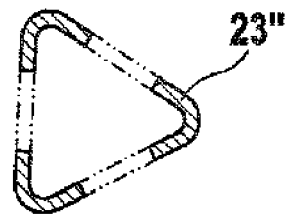

As can be seen from the sectional views in FIGS. 6a and 6b, the tappet shape of the ribs and of the free segments, in adaptation to an outer contour of the valve insert 18, is not restricted to a circular shape; instead, arbitrary shapes can be assumed. For instance, the cross section in FIG. 6a shows as an example an undulating shape of the ribs 23', and the cross section of FIG. 6b alternatively shows a triangular shape of the ribs 23". As a result, a volumetric compensation between the top and underside of the valve insert 18 can for instance be improved, or the tappet guidance between the capsule 17.1 and the valve insert 18 can be varied in an expedient way.

Figure 7:
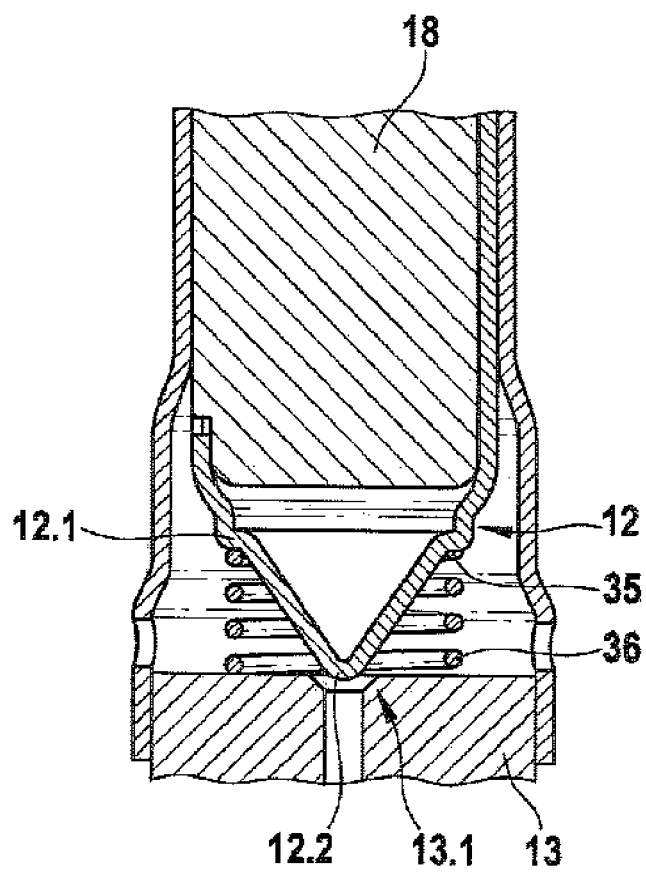
FIG. 7 shows a schematic sectional view of a further exemplary embodiment of a valve cartridge according to the invention for a solenoid valve.

As can be seen from FIG. 7, an embodiment of the valve cartridge 17 of the invention can have a restoring spring 36, which is braced on a spring contact, embodied as an integrally formed-on, encompassing support 35, on the tappet 12 and on a face end of the valve body 13. The restoring spring 36, in the exemplary embodiment shown, keeps the main valve seat open in the currentless state.

The principle of the valve cartridge of the invention can be employed in solenoid valves that are open when without current or closed when without current.

The valve cartridge of the invention makes the existing magnetic force more effectively available for tappet motion and for the internal equilibrium of forces of the solenoid valve. Moreover, the guidance of the tappet and armature is improved, while the outer dimensions of the valve cartridge are unchanged or similar, because degrees of freedom are reduced. By the altered part geometries, altered production methods become possible, which advantageously result in less-expensive and/or more-precise parts.

The foregoing relates to the preferred exemplary embodiments of the invention, it being understood that other variants and embodiments thereof are possible within the spirit and scope of the invention, the latter being defined by the appended claims.

The invention claimed is:

1. A valve cartridge for a solenoid valve, having a capsule, a magnet armature guided movably inside the capsule, a valve insert inserted into the capsule, and a valve body with a main valve seat, in which the magnet armature, moved by a magnetic force that has been generated, moves a tappet guided by the valve insert, which tappet has a closing element with a sealing element, and in which the sealing element, for performing a sealing function, plunges sealingly into the main valve seat, the valve insert being embodied for bracing itself by at least two ribs radially on the capsule, and the tappet being guided between the valve insert and the capsule via at least two corresponding longitudinal ribs of the tappet, wherein dimensions of the at least two ribs of the valve insert and dimensions of the at least two corresponding longitudinal ribs of the tappet are adapted to one another.

2. The valve cartridge as defiled by claim 1, wherein the valve insert is embodied with at least three ribs, and the tappet is embodied with at least three corresponding longitudinal ribs, and angles between individual ribs and between individual longitudinal ribs are unequal.

3. The valve cartridge as defined by claim 1, wherein the tappet is guided axially by the longitudinal ribs that are disposed between the ribs in free segments of the valve insert.

4. The valve cartridge as defined by claim 2, wherein the tappet is guided axially by the longitudinal ribs that are disposed between the ribs in free segments of the valve insert.

5. The valve cartridge as defined by claim 1, wherein the longitudinal ribs of the tappet rest flatly on a pole face of the magnet armature.

6. The valve cartridge as defined by claim 2, wherein the longitudinal ribs of the tappet rest flatly on a pole face of the magnet armature.

7. The valve cartridge as defined by claim 3, wherein the longitudinal ribs of the tappet rest flatly on a pole face of the magnet armature.

8. The valve cartridge as defined by claim 1, wherein the longitudinal ribs of the tappet engage corresponding indentations in a pole face of the magnet armature.

9. The valve cartridge as defined by claim 2, wherein the longitudinal ribs of the tappet engage corresponding indentations in a pole face of the magnet armature.

10. The valve cartridge as defined by claim 3, wherein the longitudinal ribs of the tappet engage corresponding indentations in a pole face of the magnet armature.

11. The valve cartridge as defined by claim 4, wherein the tappet has an integrally formed-on, encompassing support for a restoring spring that is braced on one face end of the valve body.

12. The valve cartridge as defined by claim 5, wherein the tappet has an integrally formed-on, encompassing support for a restoring spring that is braced on one face end of the valve body.

13. The valve cartridge as defined by claim 8, wherein the tappet has an integrally formed-on, encompassing support for a restoring spring that is braced on one face end of the valve body.

14. The valve cartridge as defined by claim 1, wherein the longitudinal segments of the tappet, in adaptation to an outer contour of the valve insert, have a shape of essentially a circular portion or an undulating shape or a triangular shape.

15. The valve cartridge as defined by claim 13, wherein the longitudinal segments of the tappet, in adaptation to an outer contour of the valve insert, have a shape of essentially a circular portion or an undulating shape or a triangular shape.

16. The valve cartridge as defined by claim 1, wherein the capsule is calked in a calking region with a fluid block via a valve bush, and the valve body is inserted with the main valve seat into the capsule.

17. The valve cartridge as defined by claim 15, wherein the capsule is calked in a calking region with a fluid block via a valve bush, and the valve body is inserted with the main valve seat into the capsule.

18. The valve cartridge as defined by claim 1, wherein the valve body is pressed in fluid-tight fashion with the fluid block.

19. The valve cartridge as defined by claim 17, wherein the valve body is pressed in fluid-tight fashion with the fluid block.

20. A solenoid valve, including a valve cartridge as defined by claim 1.

* * * * *